United States Patent
Umeda et al.

(10) Patent No.: US 11,964,232 B2
(45) Date of Patent: Apr. 23, 2024

(54) CARBON DIOXIDE RECOVERY SYSTEM AND WORKING ELECTRODE

(71) Applicants: DENSO CORPORATION, Kariya (JP); KYOTO UNIVERSITY, Kyoto (JP)

(72) Inventors: Hiroaki Umeda, Kariya (JP); Youhei Morimoto, Kariya (JP); Hiroki Takezaki, Kariya (JP); Satoshi Horike, Kyoto (JP)

(73) Assignees: DENSO CORPORATION, Kariya (JP); KYOTO UNIVERSITY, Kyoto (JP)

( * ) Notice: Subject to any disclaimer, the term of this patent is extended or adjusted under 35 U.S.C. 154(b) by 27 days.

(21) Appl. No.: 17/515,666

(22) Filed: Nov. 1, 2021

(65) Prior Publication Data
US 2022/0134278 A1 May 5, 2022

(30) Foreign Application Priority Data
Oct. 30, 2020 (JP) ................................. 2020-182708

(51) Int. Cl.
*C25B 11/02* (2021.01)
*B01D 53/32* (2006.01)
(Continued)

(52) U.S. Cl.
CPC .......... *B01D 53/326* (2013.01); *C25B 11/031* (2021.01); *C25B 11/043* (2021.01)

(58) Field of Classification Search
CPC .... C25B 11/031; C25B 11/043; B01D 53/326
See application file for complete search history.

(56) References Cited

U.S. PATENT DOCUMENTS 4,287,032 A † 9/1981 Pellegri
8,377,999 B2 † 2/2013 Cote
(Continued)

FOREIGN PATENT DOCUMENTS

JP 2017-078192 A 4/2017
JP 2017-125234 A † 7/2017
(Continued)

OTHER PUBLICATIONS

Reinsch et al., The first keto-functionalized microporous Al-based metal-organic framework:[Al(OH)(O2C-C6H4-CO-C6H4-CO2)], FP7/2007-2013, pp. 1-24.
(Continued)

*Primary Examiner* — Zulmariam Mendez
(74) *Attorney, Agent, or Firm* — Oliff PLC (57) ABSTRACT

Provided is a carbon dioxide recovery system that separates $CO_2$ from a $CO_2$-containing gas containing $CO_2$ by an electrochemical reaction, and comprises an electrochemical cell comprising a working electrode containing a $CO_2$ adsorbent, and a counter electrode. Application of a voltage between the working electrode and the counter electrode causes electrons to be supplied from the counter electrode to the working electrode, and enables the $CO_2$ adsorbent to bind to $CO_2$ as electrons are supplied. The $CO_2$ adsorbent is a crystalline porous body, and has a molecular structure in which a functional group that exchanges electrons and binds to $CO_2$ is regularly arranged.

16 Claims, 10 Drawing Sheets

(51) Int. Cl.
  *C25B 11/031* (2021.01)
  *C25B 11/043* (2021.01)

(56) References Cited

U.S. PATENT DOCUMENTS

| | | | |
|---|---|---|---|
| 2007/0227898 A1 | 10/2007 | Muller et al. |
| 2007/0248852 A1 | 10/2007 | Mueller et al. |
| 2011/0105776 A1 | 5/2011 | Muller et al. |
| 2017/0113182 A1 | 4/2017 | Voskian et al. |
| 2020/0023307 A1 | 1/2020 | Voskian et al. |

FOREIGN PATENT DOCUMENTS

| | | | |
|---|---|---|---|
| WO | 2017/075014 A1 † | 2/2013 |
| WO | 2020/113281 A1 | 6/2020 |

OTHER PUBLICATIONS

Zhang et al. "Supporting Information Monitoring the Solid-state Electrochemistry of Cu(2,7-AQDC) (AQDC=anthraquinone dicarboxylate) in a Lithium Battery: Coexistence of Metal and Ligand Redox Activities in a Metal-Organic framework," pp. S1-S13.

Gao X. et al., "MOFs and COFs for Batteries and Supercapacitors", Electrochemical Energy Reviews, (2020) 3:81-126, Oct. 25, 2019.

Tang B. et al., "Mechanism of electrochemical lithiation of a metal-organic framework without redox-active nodes", J. Chem. Phys. 144, 194702 (2016).

Noro S. et al., "Fluorine-functionalized metal-organic frameworks and porous coordination polymers", NPG Asia Materials, pp. 1-14, Sep. 29, 2017.

Li J. et al., "Porous materials with pre-designed single-molecule traps for CO2 selective adsorption", Nature Communications, pp. 1-8, Feb. 26, 2013.

Joseph H. Rheinhardt et al., "Electrochemical Capture and Release of Carbon Dioxide," ACS Energy Lett., vol. 2, pp. 454-461 (2017).†

Catherine R. Deblase et al., "Rapid and Efficient Redox Processes within 2D Covalent Organic Framework Thin Films," ACS Nano, vol. 9, No. 3, pp. 3178-3183 (2015).†

Deanna M. D'Alessandro et al., "Carbon Dioxide Capture: Prospects for New Materials," Angew. Chem. Int. Ed. vol. 49, pp. 6058-6082 (2010).†

Paula J. Celis-Salazar et al., "Proton-Coupled Electron Transport in Anthraquinone-Based Zirconium Metal-Organic Frameworks," Inorg. Chem., vol. 56, pp. 13741-13747 (2017).†

Ravichandar Babarao et al., "Molecular Screening of Metal-Organic Frameworks for CO2 Storage," Langmuir, vol. 24, pp. 6270-6278 (2008) and Supporting Information, pp. S1-S6.†

Helge Reinsch et al., "First Keto-Functionalized Microporous Al-Based Metal-Organic Framework: [Al(OH)(O2C-C6H4-CO-C6H4-CO2)]," Inorg. Chem., vol. 52, pp. 1854-1859 (2013) and Supporting Information, 9 pages.†

† cited by third party

CARBON DIOXIDE RECOVERY SYSTEM AND WORKING ELECTRODE

CROSS-REFERENCE TO RELATED APPLICATION

This application is based on and claims the benefit of priority from earlier Japanese Patent Application No. 2020-182708 filed Oct. 30, 2020, the description of which is incorporated herein by reference.

BACKGROUND

The present invention relates to a carbon dioxide recovery system that recovers $CO_2$ from a $CO_2$-containing gas, and a working electrode used in the carbon dioxide recovery system.

There has been known a device that separates $CO_2$ from a $CO_2$-containing gas by an electrochemical reaction.

SUMMARY

A carbon dioxide recovery system according to an aspect of the present disclosure is a carbon dioxide recovery system that separates $CO_2$ from a $CO_2$-containing gas by an electrochemical reaction. The carbon dioxide recovery system comprises an electrochemical cell comprising a working electrode containing a $CO_2$ adsorbent, and a counter electrode. The $CO_2$ adsorbent is a crystalline porous body, and has a molecular structure in which a functional group that exchanges electrons and binds to $CO_2$ is regularly arranged.

DETAILED DESCRIPTION OF THE PREFERRED EMBODIMENTS

In JP 2018-533470 A, a device that separates $CO_2$ from a $CO_2$-containing gas by an electrochemical reaction is proposed.

The device described in JP 2018-533470 A includes an electrochemical cell in which the working electrode is provided with a $CO_2$ adsorbent. When a potential difference is applied between the working electrode and counter electrode of the electrochemical cell and electrons are supplied to the working electrode, a functional group contained in the $CO_2$ adsorbent attracts the electrons and forms a $CO_2$ adsorption site.

Furthermore, in the device described in JP 2018-533470 A, a porous carbon fiber is used as an electrode base material. The porous carbon fiber serves as a current collector, and a $CO_2$-containing gas can be diffused through the voids of the porous carbon fiber and brought into contact with the $CO_2$ adsorbent.

In a carbon dioxide recovery system, increasing the density of $CO_2$ adsorption sites is effective for obtaining a desired $CO_2$ recovery rate while also reducing the size of the system. However, it is difficult to increase the density of $CO_2$ adsorption sites with a $CO_2$ adsorbent alone.

Furthermore, although it is possible to increase the contact area between the surface of a $CO_2$ adsorbent and a $CO_2$-containing gas in a working electrode by bringing the $CO_2$ adsorbent into contact with a porous electrode base material, there is a limit to the extent in which the density of $CO_2$ adsorption sites can be increased in the working electrode due to the presence of the electrode base material.

In view of the above points, the present invention has an object of providing a carbon dioxide recovery system which is capable of increasing the density of $CO_2$ adsorption sites in an electrochemical cell, and a working electrode used in the carbon dioxide recovery system.

In order to achieve the above object, a carbon dioxide recovery system according to an aspect of the present disclosure is carbon dioxide recovery system that separates $CO_2$ from a $CO_2$-containing gas which contains $CO_2$ by an electrochemical reaction. The carbon dioxide recovery system comprises an electrochemical cell (101) comprising a working electrode (102) containing a $CO_2$ adsorbent (102b), and a counter electrode (103). Application of a voltage between the working electrode and the counter electrode causes electrons to be supplied from the counter electrode to the working electrode, and enables the $CO_2$ adsorbent to bind to $CO_2$ as electrons are supplied. The $CO_2$ adsorbent is a crystalline porous body, and has a molecular structure in which a functional group that exchanges electrons and binds to $CO_2$ is regularly arranged.

Consequently, $CO_2$ adsorption sites can be regularly arranged in the crystalline porous body constituting the $CO_2$ adsorbent, and the density of $CO_2$ adsorption sites can be increased. As a result, a desired $CO_2$ recovery rate can be obtained while also reducing the size of the carbon dioxide recovery system.

Figure 1:
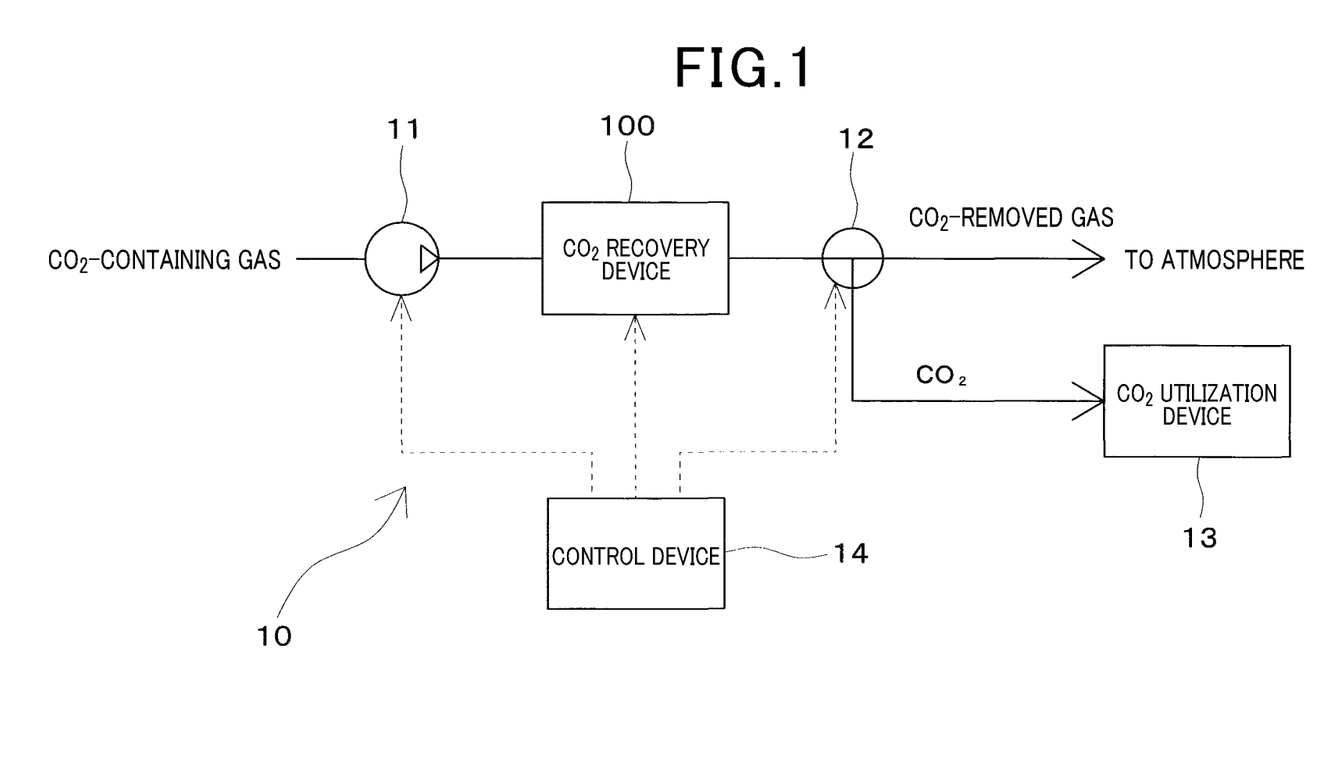
FIG. 1 is a diagram showing a carbon dioxide recovery system according to an embodiment of the present invention.

Hereinafter, an embodiment of the present invention will be described using the drawings. As shown in FIG. 1, a carbon dioxide recovery system 10 of the present embodiment includes a compressor 11, a $CO_2$ recovery device 100, a flow path switching valve 12, a $CO_2$ utilization device 13, and a control device 14.

The compressor 11 pumps a $CO_2$-containing gas to the $CO_2$ recovery device 100. The $CO_2$-containing gas is a mixed gas containing $CO_2$ and a gas other than $CO_2$. For example, air or an exhaust gas of an internal combustion engine can be used.

The $CO_2$ recovery device 100 is a device that separates and recovers $CO_2$ from the $CO_2$-containing gas. The $CO_2$ recovery device 100 discharges a $CO_2$-removed gas after $CO_2$ is recovered from the $CO_2$-containing gas, or discharges the $CO_2$ recovered from the $CO_2$-containing gas. The configuration of the $CO_2$ recovery device 100 will be described in detail later.

The flow path switching valve 12 is a three-way valve that switches the flow path of the discharged gas from the $CO_2$ recovery device 100. When a $CO_2$-removed gas is discharged from the $CO_2$ recovery device 100, the flow path switching valve 12 switches the flow path of the discharged gas to the atmosphere side. When $CO_2$ is discharged from the $CO_2$ recovery device 100, the flow path of the discharged gas is switched to the $CO_2$ utilization device 13 side.

The $CO_2$ utilization device 13 is a device that utilizes $CO_2$. Examples of the $CO_2$ utilization device 13 include a storage tank that stores $CO_2$, and a conversion device that converts $CO_2$ into a fuel. The conversion device may use a device that converts $CO_2$ into a hydrocarbon fuel such as methane. The hydrocarbon fuel may be a gaseous fuel at ordinary temperature and pressure, or a liquid fuel at ordinary temperature and pressure.

The control device 14 is composed of a known microcomputer including a CPU, a ROM, a RAM, and the like, and the peripheral circuits of the microcomputer. The control device 14 performs various calculations and processing based on a control program stored in the ROM, and controls the operation of various controlled devices. The control device 14 of the present embodiment performs operation control of the compressor 11, operation control of the $CO_2$ recovery device 100, flow path switching control of the flow path switching valve 12, and the like.

Figure 2:
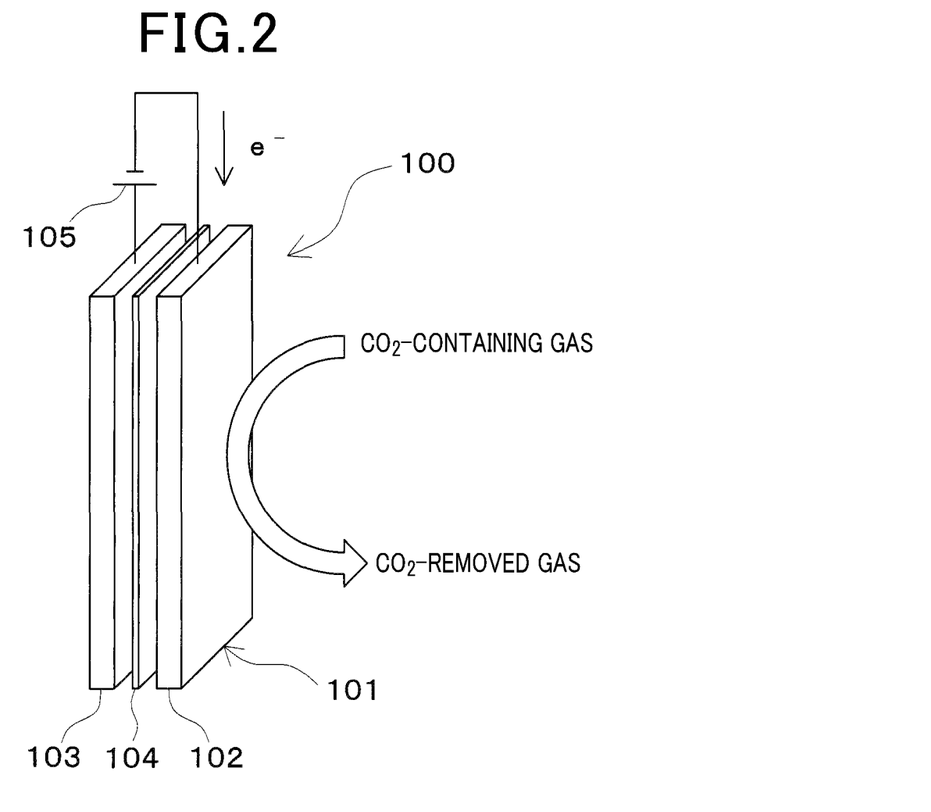
FIG. 2 is a diagram showing a CO2 recovery device.

Next, the $CO_2$ recovery device 100 will be described using FIG. 2. As shown in FIG. 2, the $CO_2$ recovery device 100 includes an electrochemical cell 101. The electrochemical cell 101 includes a working electrode 102, a counter electrode 103, and an insulating layer 104. In the example shown in FIG. 2, the working electrode 102, the counter electrode 103, and the insulating layer 104 each have a plate shape. Although the working electrode 102, the counter electrode 103, and the insulating layer 104 are shown in FIG. 2 with a spacing between them, in reality these components are arranged so as to be in contact with each other.

The electrochemical cell 101 may be housed inside a container (not shown). The container may comprise a gas inlet for allowing the $CO_2$-containing gas to flow into the container, and a gas outlet for allowing the $CO_2$-removed gas or $CO_2$ to flow out of the container.

The $CO_2$ recovery device 100 adsorbs and desorbs $CO_2$ by an electrochemical reaction, and is capable of separating and recovering $CO_2$ from the $CO_2$-containing gas. The $CO_2$ recovery device 100 has a power supply 105 that applies a predetermined voltage to the working electrode 102 and the counter electrode 103, and is capable of changing the potential difference between the working electrode 102 and the counter electrode 103. The working electrode 102 is the negative electrode, and the counter electrode 103 is the positive electrode.

The electrochemical cell 101 operates by switching between a $CO_2$ recovery mode, in which $CO_2$ is recovered at the working electrode 102, and a $CO_2$ discharge mode, in which $CO_2$ is discharged from the working electrode 102, by changing the potential difference between the working electrode 102 and the counter electrode 103. The $CO_2$ recovery mode is a charging mode that charges the electrochemical cell 101. The $CO_2$ discharge mode is a discharging mode that discharges the electrochemical cell 101.

In the $CO_2$ recovery mode, a first voltage V1 is applied between the working electrode 102 and the counter electrode 103, and electrons are supplied from the counter electrode 103 to the working electrode 102. At the first voltage V1, the working electrode potential is lower than the counter electrode potential. The first voltage V1 can be, for example, in the range of 0.5 to 2.0 V.

In the $CO_2$ discharge mode, a lower second voltage V2 is applied between the working electrode 102 and the counter electrode 103, and electrons are supplied from the working electrode 102 to the counter electrode 103. The second voltage V2 is a lower voltage than the first voltage V1, and the magnitude relationship between the working electrode potential and the counter electrode potential is not limited. That is to say, in the $CO_2$ discharge mode, the working electrode potential may be lower than the counter electrode potential, the working electrode potential may be equal to the counter electrode potential, or the working electrode potential may be higher than the counter electrode potential.

Figure 3:
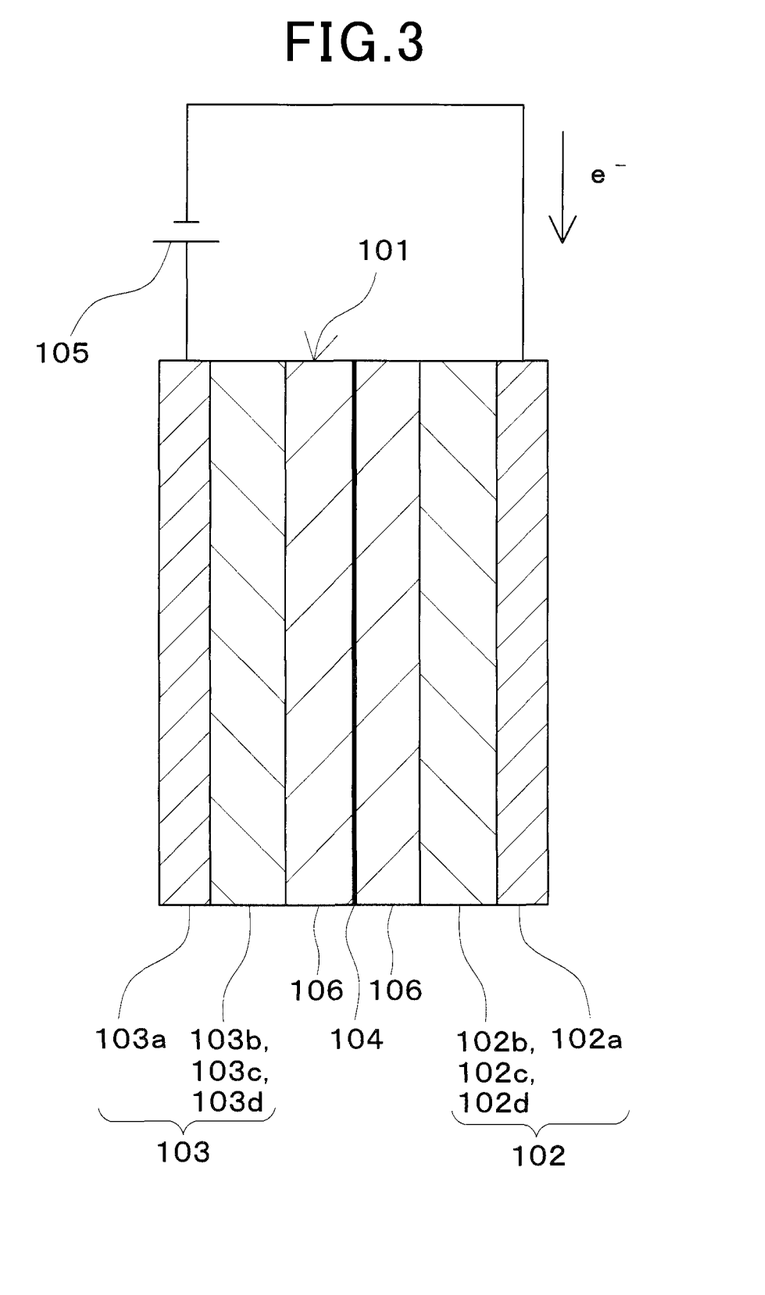
FIG. 3 is a cross-sectional view of an electrochemical cell.
Figure 4:
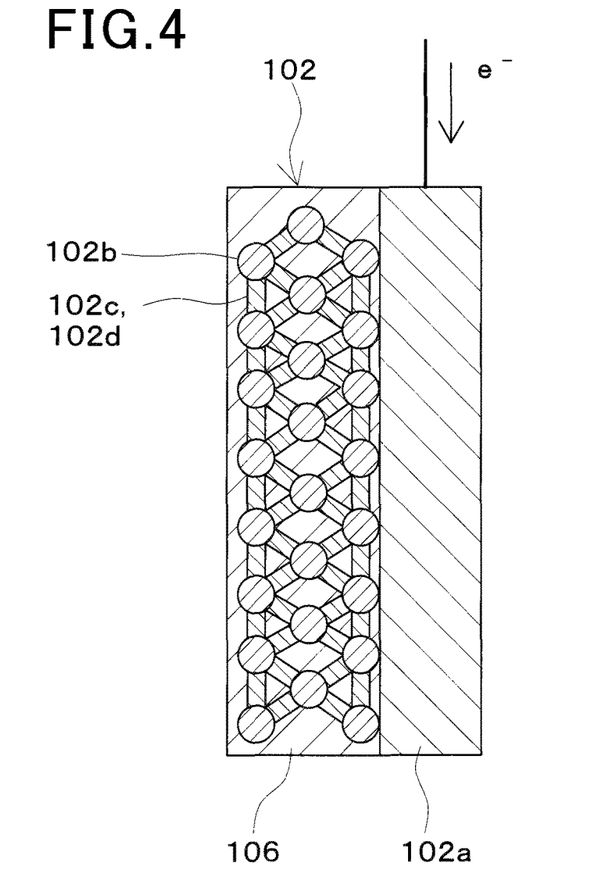
FIG. 4 is a cross-sectional view showing the working electrode of the electrochemical cell.

As shown in FIG. 3 and FIG. 4, the working electrode 102 includes a working electrode base material (electrode base material) 102a, a $CO_2$ adsorbent 102b, a working electrode conductive material 102c, and a working electrode binder 102d. For convenience, FIG. 3 is illustrated with the $CO_2$ adsorbent 102b, the working electrode conductive material 102c, and the working electrode binder 102d in a different position to the working electrode base material 102a. However, in reality the $CO_2$ adsorbent 102b, the working electrode conductive material 102c, and the working electrode binder 102d are provided inside a porous working electrode base material 102a.

The working electrode base material 102a is a porous and electrically conductive material having pores that a gas containing $CO_2$ can pass through. Examples of the working electrode base material 102a include carbonaceous materials and metallic materials. Examples of carbonaceous materials that can be used to form the working electrode base material 102a include carbon paper, carbon cloth, non-woven carbon mats, and porous gas diffusion layers (GDL). Examples of metallic materials that can be used to form the working electrode base material 102a include metallic meshes in which a metal (such as Al or Ni) has been processed into a mesh form.

The $CO_2$ adsorbent 102b is redox active, and contains a material which is an electroactive species capable of reversibly causing a redox reaction. The $CO_2$ adsorbent 102b is capable of binding and adsorbing $CO_2$ when in a reduced state, and discharging $CO_2$ when in an oxidized state.

In the present embodiment, a crystalline porous body is used as the $CO_2$ adsorbent 102b. The crystalline porous body has a crystal structure in which atoms or molecules are three-dimensionally arranged in a repeating pattern. Further, a large number of pores are formed that a $CO_2$-containing gas can pass through. The crystalline porous body used as the $CO_2$ adsorbent 102b has a molecular structure in which a functional group that binds to $CO_2$ by exchanging electrons is regularly arranged.

Figure 5:
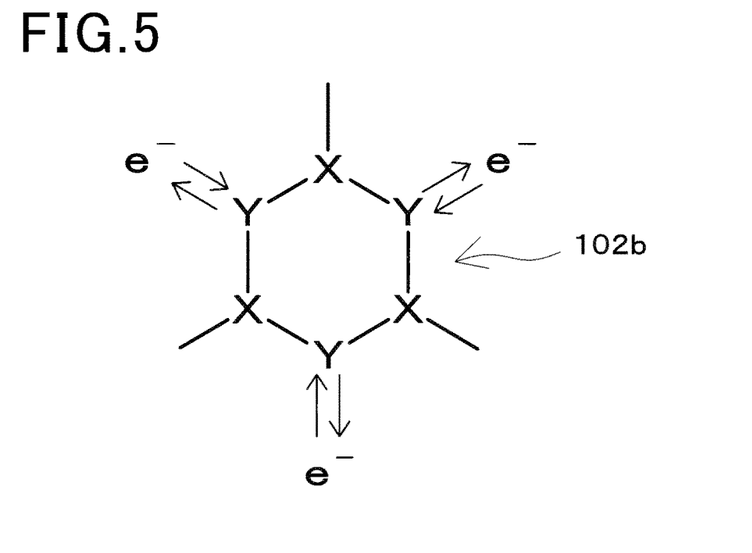
FIG. 5 is a diagram for describing lattice points and bridging portions in a crystalline porous body.

FIG. 5 conceptually shows the crystalline porous body constituting the $CO_2$ adsorbent 102b. The crystalline porous body contains a crystal lattice having lattice points and bridging portions. Lattice points are points in a crystal around which the surrounding atomic arrangement is the same. Lattice points are points located at the corners of a unit cell, and are the points at which unit cells intersect. Bridging portions represent a component that joins adjacent lattice points.

In FIG. 5, X represents an atom existing in a lattice point, and Y represents a molecule existing in a bridging portion. As shown in FIG. 5, the functional group that exchanges electrons is arranged at the bridging portions Y of the crystal lattice. Note that, although FIG. 5 shows an example where the atoms X existing at the lattice points are bonded to three other atoms, they may be bonded to four or more other atoms.

The $CO_2$ adsorbent 102b contains a functional group that exchanges electrons and binds to $CO_2$. Examples of functional groups that exchange electrons include a functional groups that contain an atom having a high electronegativity, such as F, O, N, Cl, and S.

In order for a crystalline porous body to have a planar or three-dimensional structure, the atoms existing at the lattice points must be bonded to three or more other atoms. It is difficult for atoms that have a high electronegativity to satisfy this condition. Therefore, in the $CO_2$ adsorbent 102b of the present embodiment, a stable crystal structure is realized by arranging the functional group that exchanges electrons at the bridging portions of the crystal lattice.

The functional group that binds to $CO_2$ exchanges electrons and serves as a $CO_2$ adsorption site. In the present embodiment, a functional group containing an O atom, such as a ketone group (C=O), is used as the functional group that binds to $CO_2$.

The crystalline porous body constituting the $CO_2$ adsorbent 102b may, for example, use at least one of a metal-organic framework (MOF), a covalent organic framework (COF), and a carbonaceous material. In a metal-organic framework, the functional group that exchanges electrons can be regularly arranged inside the structure as a result of an organic ligand containing the functional group that exchanges electrons forming a coordination bond to a metal. In a covalent organic framework, the functional group that exchanges electrons can be regularly arranged inside the structure as a result of a monomer containing the functional group that exchanges electrons forming bonds to form a lattice. In a carbonaceous material, the functional group that exchanges electrons can be regularly arranged inside the structure, for example, by subjecting carbon nanotubes to oxidation treatment, or by doping graphene with the functional group that transfers electrons.

In the present embodiment, a metal-organic framework is used as the $CO_2$ adsorbent 102b. A metal-organic framework is a porous structure in which metal ions are bridged by organic ligands. The metal ions constitute the lattice points, and the organic ligands constitute the bridging portions. The organic ligand of the metal-organic framework contains the functional that binds to $CO_2$.

Examples of the metal-organic framework constituting the $CO_2$ adsorbent 102b include CAU-8 and [Cu(2,7-AQDC)(DMF)]$_\infty$(Cu-MOF). In these metal-organic frameworks, the functional group that exchanges electrons is arranged at the bridging portions of the crystalline porous body. As a result, the functional group that exchanges electrons is regularly arranged with a high density in the porous crystalline body.

CAU-8 is a metal-organic framework which is reported in "H. Reinsch, M. Kruger, J. Marrot, N. Stock, First Keto-Functionalized Microporous Al-Based Metal Organic Framework: [Al(OH)(O$_2$C—C$_6$H$_4$—CO—C$_6$H$_4$—CO$_2$)], Inorg. Chem., 2013, 52, 1854-1859". CAU-8 contains Al ions as the metal ion, and benzophenone dicarboxylate as the organic ligand. CAU-8 can be synthesized by a reaction between benzophenone dicarboxylic acid and $Al_2(SO_4)_3$ in dimethylformamide (DMF).

Figure 15:
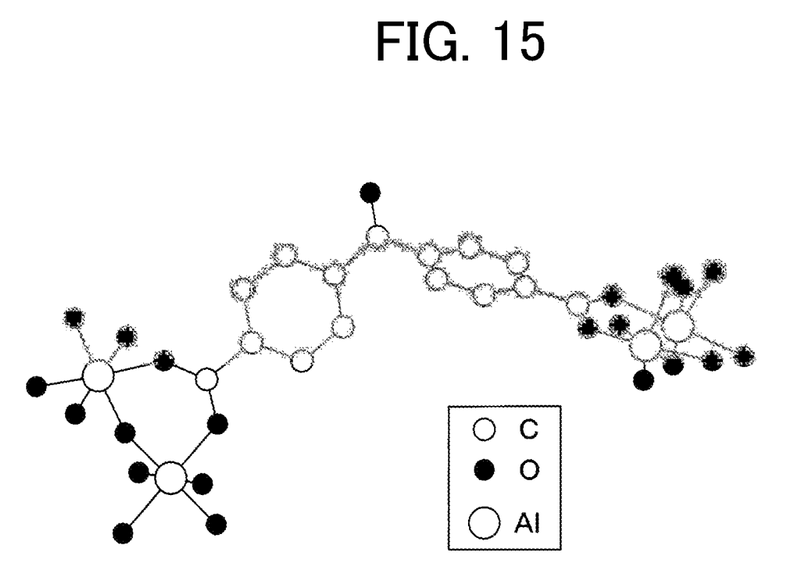
FIG. 15 shows the structure of the Al(OH)(O$_2$C—C$_6$H$_4$—CO—C$_6$H$_4$—CO$_2$) unit.

CAU-8 has the Al(OH)(O$_2$C—C$_6$H$_4$—CO—C$_6$H$_4$—CO$_2$) unit shown in FIG. 15 as the basic unit.

Figure 6:
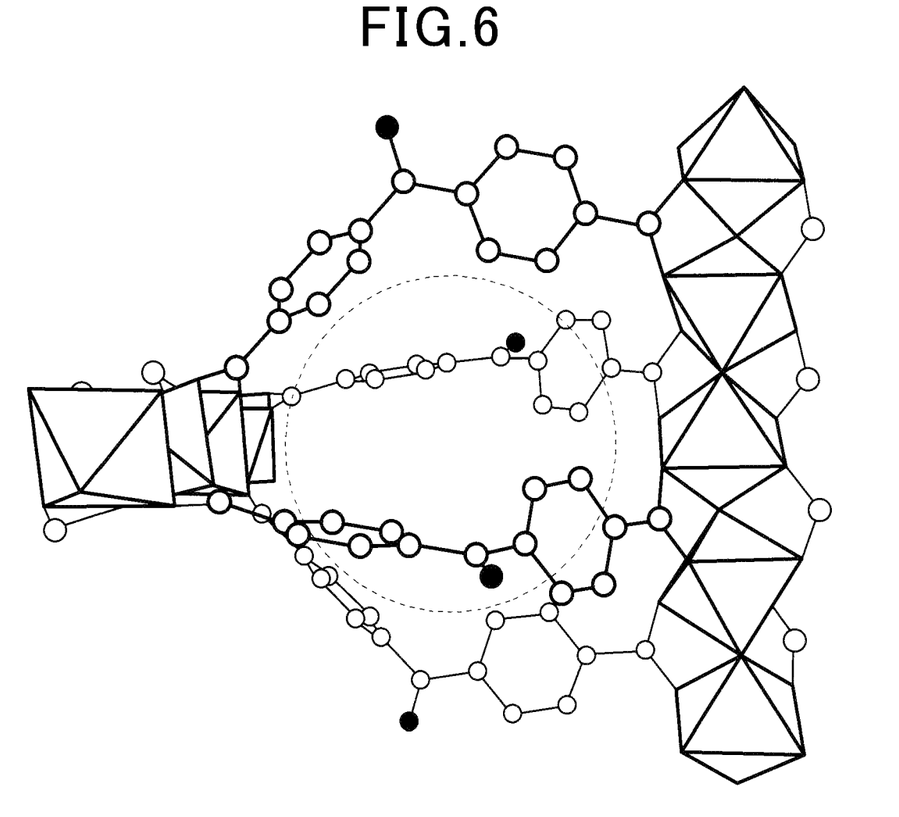
FIG. 6 is a diagram for describing the crystal structure of CAU-8.

As shown in FIG. 6, in CAU-8, four benzophenone dicarboxylate molecules (O$_2$C—C$_6$H$_4$—CO—C$_6$H$_4$—CO$_2$) bridge dinuclear Al complexes. The $Al^{3+}$ ions in CAU-8 form $AlO_6$ octahedra as a result of coordination bonding by six O atoms. CAU-8 has a straight chain of trans-connected $AlO_6$ octahedra that share a corner O atom. In CAU-8, the Al ions correspond to the lattice points, and the benzophenone dicarboxylate molecules (O$_2$C—C$_6$H$_4$—CO—C$_6$H$_4$—CO$_2$) correspond to the bridging portions. In benzophenone dicarboxylate, the O-atom containing functional group can serve as the functional group that exchanges electrons. Benzophenone dicarboxylate contains a ketone group (C=O) as the functional group that exchanges electrons. As a result, in CAU-8, the ketone group that exchanges electrons is regularly arranged with a high density.

The Cu-MOF is a metal-organic framework which is reported in "Zhongyue Zhang, Hirofumi Yoshikawa, and Kunio Awaga, Monitoring the Solid-State Electrochemistry of Cu(2,7-AQDC) (AQDC=Anthraquinone Dicarboxylate) in a Lithium Battery: Coexistence of Metal and Ligand Redox Activities in a Metal Organic Framework, J. Am. Chem. Soc. 2014, 136, 46, 16112-16115". Cu-MOF contains Cu ions as the metal ion, and anthraquinone dicarboxylate as the organic ligand. Cu-MOF can be synthesized by a reaction between 2,7-H$_2$AQDC (2,7-anthraquinone dicarboxylate), which has an anthraquinone skeleton, and Cu(ClO$_4$)$_2$ in dimethylformamide (DMF).

In Cu-MOF, the carboxylate groups in the 2 and 7 positions in 2,7-H$_2$AQDC bridge paddlewheel-type dinuclear Cu complexes to form two-dimensional sheets, and a stacked three-dimensional structure is obtained as a result of n-n stacking between the anthraquinone moieties of the two-dimensional sheets. Cu-MOF can be represented by CuC$_{16}$H$_6$O$_6$. Further, the Cu ions correspond to the lattice points, and the anthraquinone dicarboxylate molecules correspond to the bridging portions. Anthraquinone dicarboxylate contains a ketone group (C=O) as the functional group that exchanges electrons.

In the present embodiment, CAU-8 is used as the metal-organic framework constituting the $CO_2$ adsorbent 102b. The $CO_2$ adsorbent 102b is a material that takes the form of particles, and can be used after being molded into pellets or the like.

The working electrode conductive material 102c forms an electrically conductive path to the $CO_2$ adsorbent 102b. Examples of the working electrode conductive material 102c include carbonaceous materials such as carbon nanotubes, carbon black, and graphene. In the present embodiment, the $CO_2$ adsorbent 102b and the working electrode conductive material 102c are used as a mixture.

The mixing of the $CO_2$ adsorbent 102b and the working electrode conductive material 102c may be carried out, for example, by dissolving the working electrode conductive material 102c in an organic solvent such as NMP (N-methylpyrrolidone), and then bringing the working electrode conductive material 102c dispersed in the organic solvent into contact with the $CO_2$ adsorbent 102b. The contact between the working electrode conductive material 102c and the $CO_2$ adsorbent 102b can be achieved by a dip coating method or the like, in which the working electrode base material 102a containing the $CO_2$ adsorbent 102b is immersed in the solvent in which the working electrode conductive material 102c has been dispersed. As a result, the working electrode conductive material 102c can be uniformly brought into contact with the $CO_2$ adsorbent 102b.

The working electrode binder 102d is provided in order to hold the $CO_2$ adsorbent 102b in the working electrode base material 102a. The working electrode binder 102d possesses an adhesive force, and is provided between the $CO_2$ adsorbent 102b and the working electrode base material 102a.

In the present embodiment, the $CO_2$ adsorbent 102b, the working electrode conductive material 102c, and the working electrode binder 102d are used as a mixture. That is to say, a mixed layer is used in which the $CO_2$ adsorbent 102b and the working electrode conductive material 102c are dispersed in the working electrode binder 102d. A mixture of the $CO_2$ adsorbent 102b, the working electrode conductive material 102c, and the working electrode binder 102d is formed, and the mixture is adhered to the working electrode base material 102a.

An electrically conductive resin may be used as the working electrode binder 102d. Examples of the electrically conductive resin include epoxy resins and fluororesins such as polytetrafluoroethylene (PTFE) or polyvinylidene fluoride (PVDF) containing Ag or the like as a conductive filler.

In a similar manner to the working electrode conductive material 102c, the working electrode binder 102d can be brought into contact with the working electrode base material 102a containing the $CO_2$ adsorbent 102b by using an organic solvent. Alternatively, the raw material of the working electrode binder 102d and the $CO_2$ adsorbent 102b may be dispersed and mixed using a homogenizer or the like, followed by molding and pressure-bonding of the mixture to the working electrode base material 102. It is also possible to spray coat a mixture of the working electrode binder 102d and the $CO_2$ adsorbent 102b onto the working electrode base material 102a.

Returning to FIG. 3, the counter electrode 103 has the same configuration as the working electrode 102, and is provided with a counter electrode base material 103a, an electrically active auxiliary material 103b, a counter electrode conductive material 103c, and a counter electrode binder 103d.

The electrically active auxiliary material (auxiliary material) 103b has the opposite redox state to the $CO_2$ adsorbent 102b, and includes an auxiliary electrically active species that exchanges electrons with the $CO_2$ adsorbent 102b. In order for the $CO_2$ adsorbent 102b of the working electrode 102 to efficiently adsorb $CO_2$, it is necessary to supply more electrons from the counter electrode 103 to the working electrode 102. As a result, it is desirable to support as much of the electrically active auxiliary material 103b as possible on the counter electrode base material 103a.

Examples of the electrically active auxiliary material 103b include metal complexes that enable the transfer of electrons by changing the valence of the metal ion. Examples of such a metal complex include cyclopentadienyl metal complexes such as ferrocene, nickelocene and cobaltocene, and porphyrin metal complexes. In the present embodiment, polyvinyl ferrocene as shown below is used as the electrically active auxiliary material 103b.

The insulating layer 104 is arranged between the working electrode 102 and the counter electrode 103, and separates the working electrode 102 and the counter electrode 103. The insulating layer 104 prevents physical contact between the working electrode 102 and the counter electrode 103, and suppresses electrical short circuiting.

As the insulating layer 104, a separator or a gas layer such as air can be used. In the present embodiment, a porous separator is used as the insulating layer 104. Examples of the material of the separator include separators made of cellulose films, polymers, and composite materials made of a polymer and a ceramic.

An ion conductive material 106 having ionic conductivity is provided between the working electrode 102 and the counter electrode 103. The ion conductive material 106 is provided between the working electrode 102 and the counter electrode 103 via the insulating layer 104.

The ion conductive material 106 contacts the $CO_2$ adsorbent 102b. The ions contained in the ion conductive material 106 promote the electron attraction of the $CO_2$ adsorbent 102b when the $CO_2$ adsorbent 102b binds to $CO_2$. The ions contained in the ion conductive material 106 do not directly react with the functional group contained in the $CO_2$ adsorbent 102b that binds to $CO_2$.

As the ion conductive material 106, an ionic liquid, a solid electrolyte, or the like can be used. An ionic liquid is a liquid salt that which is non-volatile under ordinary temperature and pressure. When an ionic liquid is used as the ion conductive material 106, the ionic liquid may be in a gel form to prevent elution from the electrochemical cell 101. When a solid electrolyte is used as the ion conductive material 106, it is desirable to use an ionomer made of a polymer electrolyte or the like in order to increase the contact area with the $CO_2$ adsorbent 102b.

Examples of the ionic liquid include 1-ethyl-3-methylimidazolium bis(trifluoromethanesulfonyl)imide ([EMIM][Tf$_2$N]) and 1-butyl-3-methylimidazolium bis(trifluoromethanesulfonyl)imide ([BMIM][Tf$_2$N]), and 1-butyl-3-methylimidazolium tetrafluoroborate ([BMIM][BF$_4$]).

Figure 7:
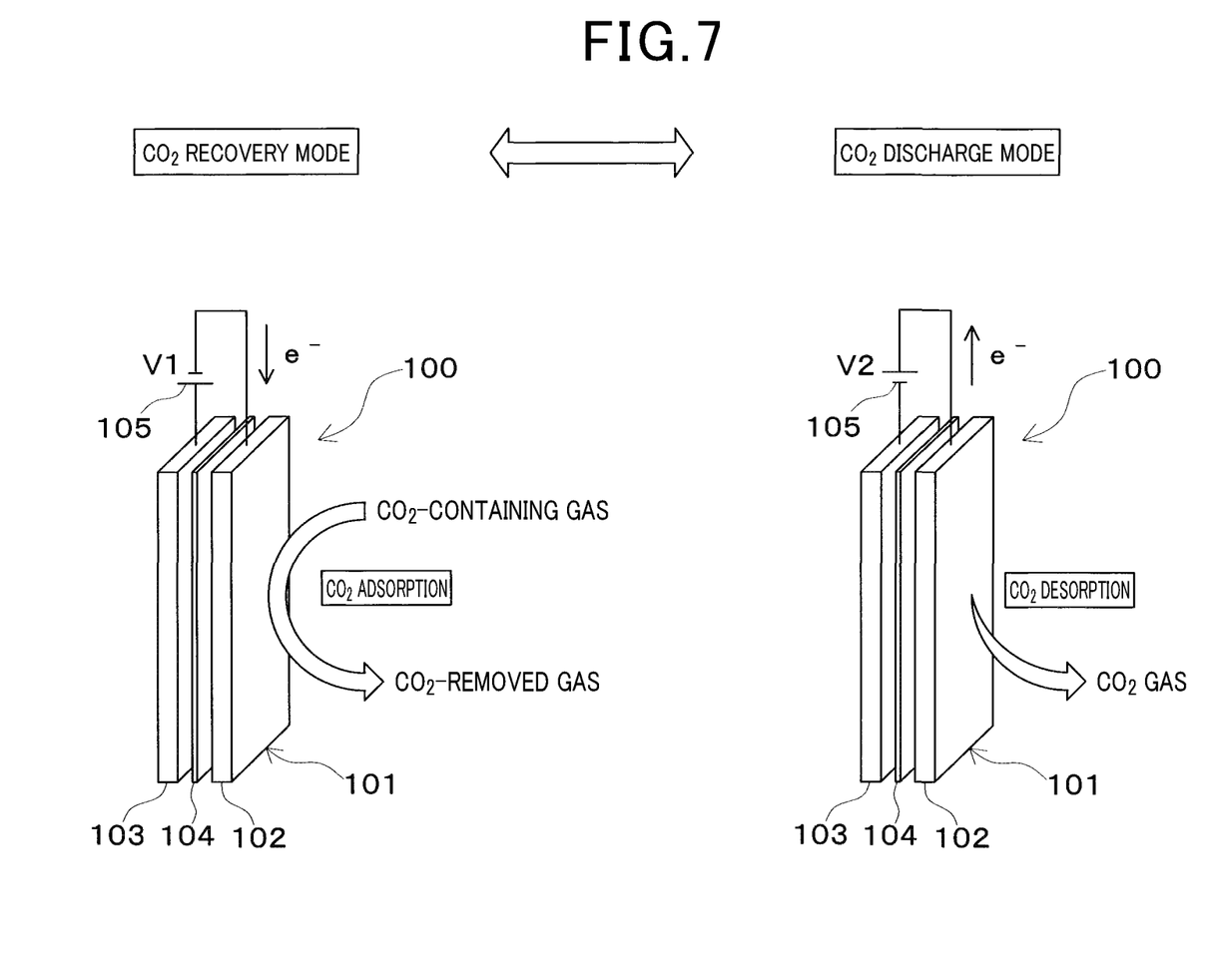
FIG. 7 is a diagram for describing the operations performed in a CO2 recovery mode and a CO2 discharge mode of the CO2 recovery device.

Next, the operation of the carbon dioxide recovery system 10 of the present embodiment will be described. As shown in FIG. 7, the carbon dioxide recovery system 10 operates by alternatingly switching between a $CO_2$ recovery mode and a $CO_2$ discharge mode. The operation of the carbon dioxide recovery system 10 is controlled by the control device 14.

First, the $CO_2$ recovery mode will be described. In the $CO_2$ recovery mode, the compressor 11 operates to supply the $CO_2$-containing gas to the $CO_2$ recovery device 100. In the $CO_2$ recovery device 100, the voltage applied between the working electrode 102 and the counter electrode 103 is set to the first voltage V1. As a result, the electron donation of the electrically active auxiliary material 103b of the counter electrode 103 and the electron attraction of the $CO_2$ adsorbent 102b of the working electrode 102 can be realized at the same time. The electrically active auxiliary material 103b of the counter electrode 103 discharges electrons to be in an oxidized state, and electrons are supplied from the counter electrode 103 to the working electrode 102.

Figure 8:
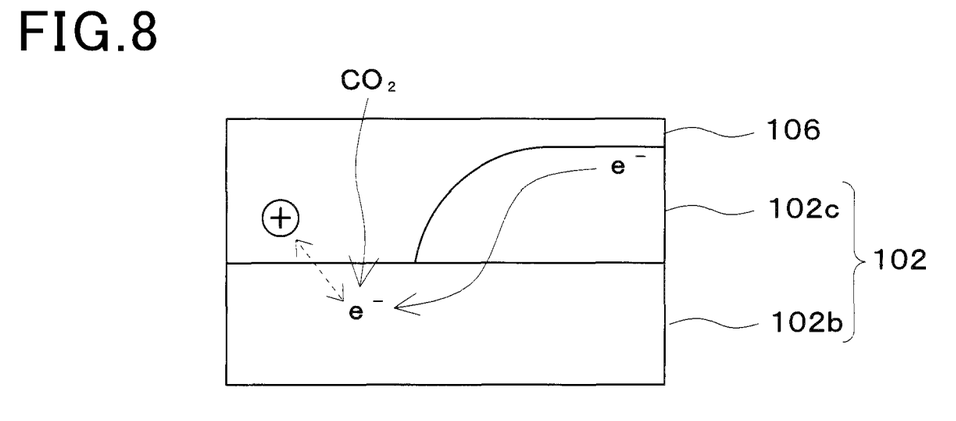
FIG. 8 is a diagram showing CO2 adsorption at the working electrode in the CO2 recovery mode.

As shown in FIG. 8, the $CO_2$ adsorbent 102b of the working electrode 102 receives electrons to be in a reduced state. The working electrode conductive material 102c functions as an electrically conductive path through which electrons supplied to the $CO_2$ adsorbent 102b are conducted. An ion contained in the ion conductive material 106 is indicated by the "+" symbol in FIG. 8, and promotes the attraction of electrons from the $CO_2$ adsorbent 102b.

The $CO_2$ adsorbent 102b in a reduced state has a high $CO_2$ binding strength, and binds and adsorbs the $CO_2$ contained in the $CO_2$-containing gas. As a result, the $CO_2$ recovery device 100 is capable of recovering $CO_2$ from the $CO_2$-containing gas.

After $CO_2$ is recovered by the $CO_2$ recovery device 100, the $CO_2$-containing gas is discharged from the $CO_2$ recovery device 100 as a $CO_2$-removed gas that does not contain $CO_2$. The flow path switching valve 12 switches the gas flow path to the atmosphere side, and the $CO_2$-removed gas is discharged from the $CO_2$ recovery device 100 to the atmosphere.

Next, the $CO_2$ discharge mode will be described. In the $CO_2$ discharge mode, the compressor 11 is stopped, and the supply of the $CO_2$-containing gas to the $CO_2$ recovery device 100 is stopped. In the $CO_2$ recovery device 100, the voltage applied between the working electrode 102 and the counter electrode 103 is set to the second voltage V2. As a result, the electron donation of the $CO_2$ adsorbent 102b of the working electrode 102 and the electron attraction of the electrically active auxiliary material 103b of the counter electrode 103 can be realized at the same time. The electrically active auxiliary material 103b of the counter electrode 103 receives electrons to be in a reduced state.

Figure 9:
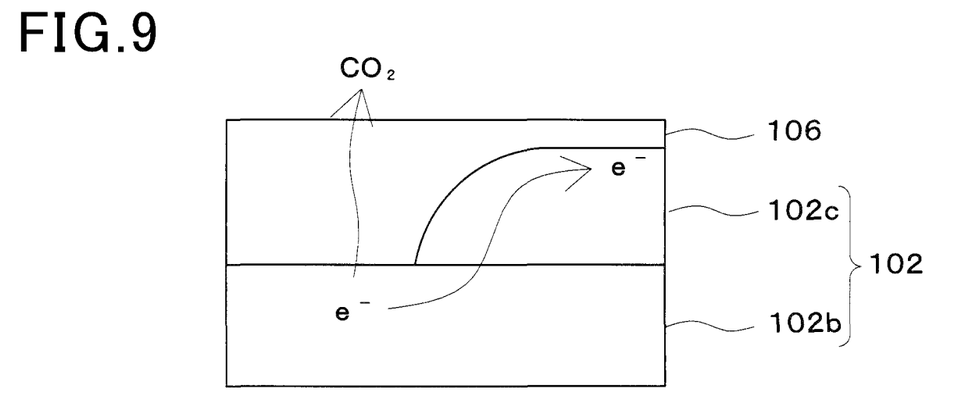
FIG. 9 is a diagram showing CO2 desorption at the working electrode in the CO2 discharge mode.

As shown in FIG. 9, the $CO_2$ adsorbent 102b of the working electrode 102 discharges electrons to be in an oxidized state. The working electrode conductive material 102c functions as an electrically conductive path through which electrons discharged from the $CO_2$ adsorbent 102b are conducted. The $CO_2$ binding strength of the $CO_2$ adsorbent 102b decreases, and $CO_2$ is desorbed and discharged.

The $CO_2$ discharged from the $CO_2$ adsorbent 102b is discharged from the $CO_2$ recovery device 100. The flow path switching valve 12 switches the gas flow path to the $CO_2$ utilization device 13 side, and the $CO_2$ discharged from the $CO_2$ recovery device 100 is supplied to the $CO_2$ utilization device 13.

Figure 10:
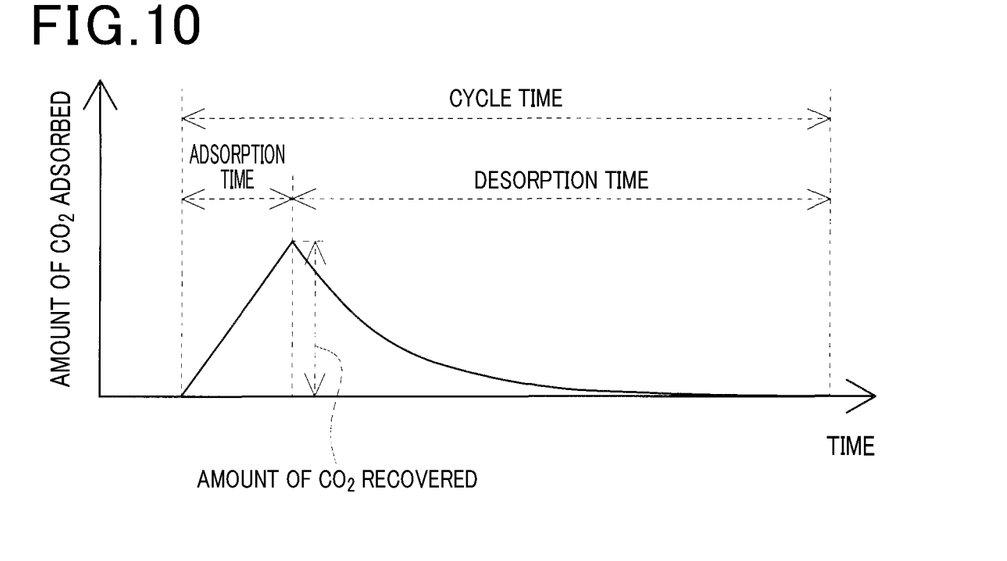
FIG. 10 is a diagram showing the CO2 adsorption time and desorption time in the CO2 recovery device.

Next, the relationship between the $CO_2$ recovery rate by the $CO_2$ recovery device 100 and the density of $CO_2$ adsorption sites will be described. As shown in FIG. 10, the $CO_2$ adsorption time and the desorption time have a relationship in which the adsorption time is less than the desorption time. The $CO_2$ recovery rate, the $CO_2$ adsorption rate, the $CO_2$ desorption rate, and the cycle time can be obtained by the following equations (1) to (4).

$$CO_2 \text{ recovery rate} = \text{Amount of } CO_2 \text{ recovered/Cycle time} \quad (1)$$

$$CO_2 \text{ adsorption rate} = \text{Amount of } CO_2 \text{ adsorbed/Adsorption time} \quad (2)$$

$$CO_2 \text{ desorption rate} = \text{Amount of } CO_2 \text{ desorbed/Desorption time} \quad (3)$$

$$\text{Cycle time} = \text{Adsorption time} + \text{Desorption time} \quad (4)$$

Here, assuming that amount of $CO_2$ recovered, the amount of $CO_2$ adsorbed, and the amount of $CO_2$ desorbed are equal, the following equation (5) holds.

$$1/CO_2 \text{ recovery rate} = (1/CO_2 \text{ adsorption rate}) + (1/CO_2 \text{ desorption rate}) \quad (5)$$

From equation (5), it can be seen that the $CO_2$ recovery rate increases as the $CO_2$ adsorption rate increases.

When the $CO_2$ adsorption reaction is expressed as $CO_2 + \sigma \leftarrow \rightarrow \sigma CO_2$ ($\sigma$: $CO_2$ adsorption site, $\sigma CO_2$: adsorbed $CO_2$), the $CO_2$ adsorption rate is obtained using equation (6) below.

$$CO_2 \text{ adsorption rate} = Ka \times Pa \times (1-\theta) - Ka' \times \theta \quad (6)$$

(Ka: forward reaction rate constant, Pa: partial pressure of $CO_2$, $\theta$: $CO_2$ adsorption site coverage, Ka': reverse reaction rate constant)

The $CO_2$ adsorption site coverage $\theta$ can be obtained using equation (7) below.

$$CO_2 \text{ adsorption site coverage } \theta = \text{Amount of } CO_2 \text{ adsorbed/Maximum amount of } CO_2 \text{ adsorbed} \quad (7)$$

The maximum amount of $CO_2$ adsorbed can be obtained using equation (8) below.

$$\text{Maximum amount of } CO_2 \text{ adsorbed} = \text{Density of } CO_2 \text{ adsorption sites} \times \text{Volume of } CO_2 \text{ adsorbent} \quad (8)$$

From equations (6) to (8), it can be seen that the maximum amount of $CO_2$ adsorbed increases as the density of $CO_2$ adsorption sites increases. Further, the $CO_2$ adsorption site coverage $\theta$ decreases as the maximum amount of $CO_2$ adsorbed increases. Also, the $CO_2$ adsorption rate increases as the $CO_2$ adsorption site coverage $\theta$ decreases.

From the above, it can be derived that the $CO_2$ recovery rate increases as the density of $CO_2$ adsorption sites increases.

Figure 11:
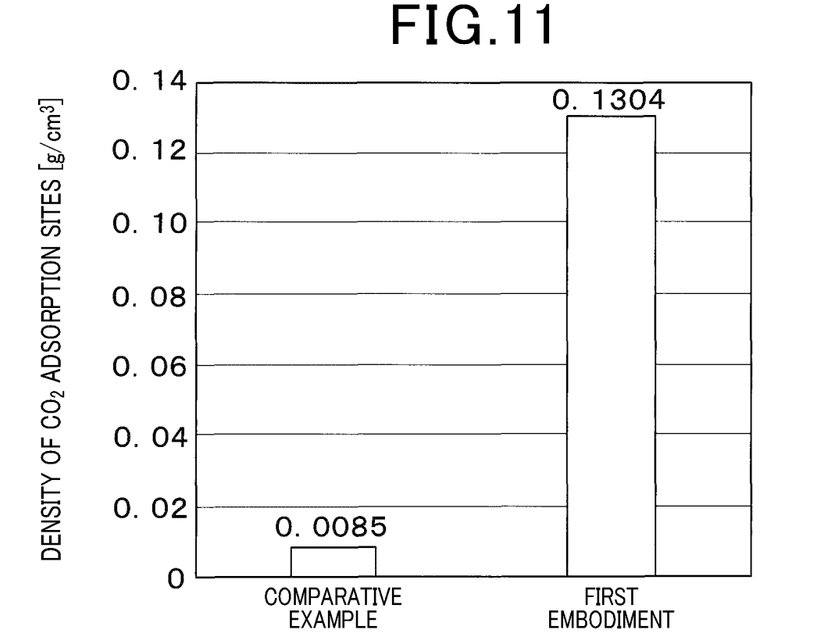
FIG. 11 is a diagram showing the density of CO2 adsorption sites in an embodiment and in a comparative example.
Figure 12:
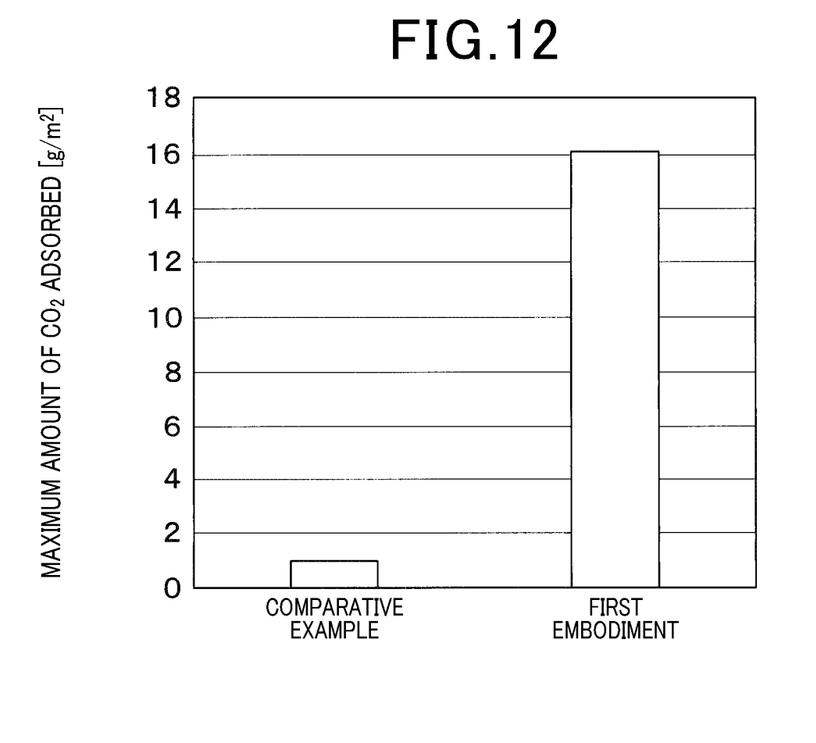
FIG. 12 is a diagram showing the maximum amount of CO2 adsorbed in the embodiment and in the comparative example.

Next, the density of $CO_2$ adsorption sites and the maximum amount of $CO_2$ adsorbed in the $CO_2$ recovery device 100 of the present embodiment will be described. In FIG. 11 and FIG. 12, CAU-8 was used as the $CO_2$ adsorbent 102b in the present embodiment, and anthraquinone as described in JP 2018-533470 A was used as the $CO_2$ adsorbent in the comparative example.

In FIG. 11, the density of $CO_2$ adsorption sites in the comparative example was calculated based on the numeric values described in JP 2018-533470 A. The density of $CO_2$ adsorption sites in the present embodiment was calculated based on the single-crystal structure of CAU-8. As a result, the density of $CO_2$ adsorption sites in the comparative example was 0.0085 g/cm$^3$, and the density of $CO_2$ adsorption sites in the present embodiment was 0.1304 g/cm$^3$. In this manner, in the $CO_2$ recovery device of the present embodiment, the density of $CO_2$ adsorption sites can be dramatically increased compared to the comparative example.

FIG. 12 shows the maximum amount of $CO_2$ adsorbed per 1 m$^2$ of the electrode. The maximum amount of $CO_2$ adsorbed is the amount of $CO_2$ adsorbed when a constant voltage (1.5 V) is applied to the $CO_2$ recovery device 100 for a sufficient time. In FIG. 12, the maximum amount of $CO_2$ adsorbed in the comparative example was obtained by experiment. The maximum amount of $CO_2$ adsorbed in the present embodiment was calculated by multiplying the maximum amount of $CO_2$ adsorbed in the comparative example by the ratio of the density of $CO_2$ adsorption sites in the comparative example to the density of $CO_2$ adsorption sites in the present embodiment shown in FIG. 11. As a result, the maximum amount of $CO_2$ adsorbed in the comparative example was about 1 g/m$^2$, and the maximum amount of $CO_2$ adsorbed in the present embodiment was about 16 $g/m^2$. In this manner, in the $CO_2$ recovery device 100 of the present embodiment, the maximum amount of $CO_2$ adsorbed can be dramatically increased compared to the comparative example.

Figure 13:
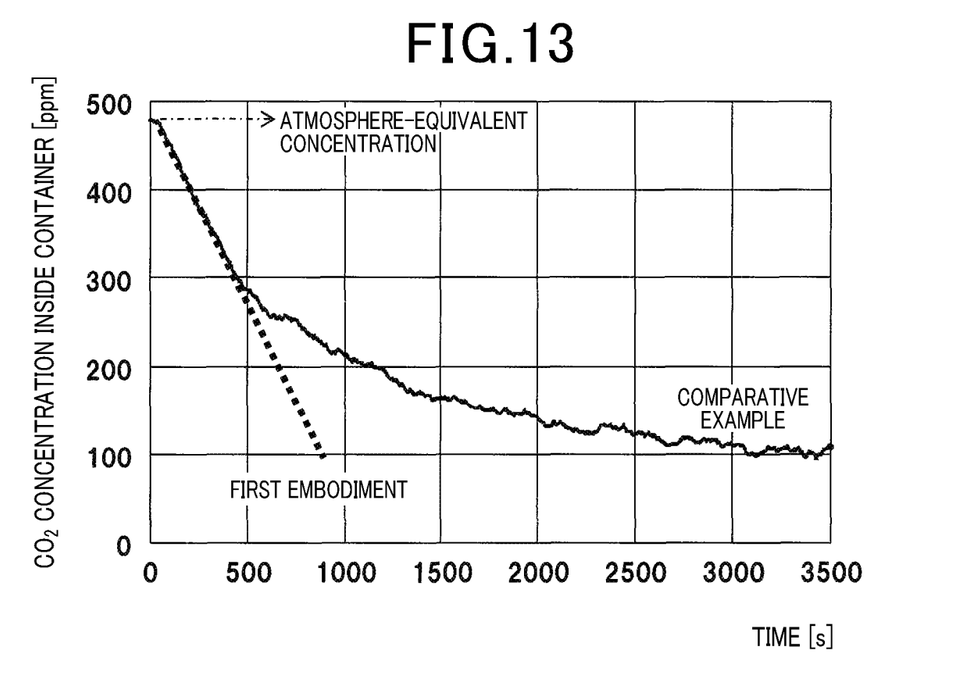
FIG. 13 is a diagram showing the CO2 adsorption rate in the embodiment and in the comparative and example.

Next, the $CO_2$ recovery rate of the $CO_2$ recovery device 100 of the present embodiment will be described. FIG. 13 shows the change in $CO_2$ concentration over time inside a container housing the $CO_2$ recovery device 100 upon introduction of air into the container, followed by sealing of the container, and application of a constant voltage (1.5 V) to the $CO_2$ recovery device 100. In FIG. 13, CAU-8 was used as the $CO_2$ adsorbent 102*b* of the present embodiment, and anthraquinone as described in JP 2018-533470 A was used as the $CO_2$ adsorbent of the comparative example.

As shown in FIG. 13, before $CO_2$ adsorption by the $CO_2$ recovery device 100, the $CO_2$ concentration inside the container was equivalent to the atmospheric $CO_2$ concentration. Then, when $CO_2$ adsorption was performed by the $CO_2$ recovery device 100, the $CO_2$ concentration inside the container decreased. This indicated that the higher rate of reduction in the $CO_2$ concentration inside the container, the higher the $CO_2$ adsorption rate of the $CO_2$ recovery device 100.

In the comparative example, the rate of reduction in the $CO_2$ concentration inside the container decreased over time. This indicated that as the amount of $CO_2$ adsorbed by the $CO_2$ adsorbent (anthraquinone) increased, the $CO_2$ adsorption site coverage increased, and the $CO_2$ adsorption rate decreased. In contrast, in the present embodiment, the rate of reduction in the $CO_2$ concentration in the container was maintained at a high level over time. This indicated that, because the density of $CO_2$ adsorption sites in the $CO_2$ adsorbent (CAU-8) was large, the $CO_2$ adsorption site coverage did not become large, which suppressed the decrease in the $CO_2$ adsorption rate.

In the $CO_2$ recovery device 100 of the present embodiment described above, a crystalline porous body having a functional group that exchanges electrons and binds to $CO_2$ which is regularly arranged is used as the $CO_2$ adsorbent 102*b*. Consequently, $CO_2$ adsorption sites can be regularly arranged in the crystalline porous body constituting the $CO_2$ adsorbent 102*b*, and the density of $CO_2$ adsorption sites can be increased. As a result, a desired $CO_2$ recovery rate can be obtained while also reducing the size of the carbon dioxide recovery system.

Furthermore, in the present embodiment, the crystalline porous body constituting the $CO_2$ adsorbent 102*b* has the functional group that exchanges electrons arranged at the bridging portions. As a result, by arranging the functional group containing an atom having a high electronegativity at the bridging portions of the crystal, a stable crystal structure can be obtained.

Moreover, in the present embodiment, CAU-8, in which benzophenone dicarboxylate molecules containing a ketone group are coordinated to Al ions, is used as the $CO_2$ adsorbent 102*b*. As a result, the ketone groups that exchange electrons can be arranged at the bridging portions of the metal-organic framework possessing a three-dimensional crystal structure. Therefore, the ketone groups can be regularly arranged at a high density in the metal-organic framework.

Also, in the present embodiment, the working electrode 102 is provided with the working electrode base material 102*a*, and the $CO_2$ adsorbent 102*b* is held in the working electrode base material 102*a*. The working electrode base material 102*a* forms an electrically conductive path for the $CO_2$ adsorbent 102*b*, and also serves as a support that holds the $CO_2$ adsorbent 102*b*.

In addition, in the present embodiment, a porous and electrically conductive material that a gas containing $CO_2$ can pass through is used as the working electrode base material 102*a*. As a result, the $CO_2$-containing gas can be brought into contact with the $CO_2$ adsorbent 102*b* held inside the working electrode base material 102*a*.

Furthermore, in the present embodiment, the $CO_2$ adsorbent 102*b* and the working electrode conductive material 102*c* are used as a mixture. As a result, the $CO_2$-containing gas can be diffused by the porous $CO_2$-containing gas 102*b* itself. Further, an electrically conductive path to the $CO_2$ adsorbent 102*b* can be formed by the working electrode conductive material 102*c*. As a result, the amount of raw material used for the working electrode base material 102*a* can be reduced as much as possible. As a result, the proportion of the $CO_2$ adsorbent 102*b* in the working electrode 102 can be increased, and the density of $CO_2$ adsorption sites can be improved.

Moreover, in the present embodiment, a carbonaceous material is used as the working electrode conductive material 102*c*. As a result, an electrically conductive path to the $CO_2$ adsorbent 102*b* can be formed by the working electrode conductive material 102*c*, which has a smaller volume than that of the porous carbon fiber used as the working electrode base material 102*a*.

Also, in the present embodiment, the electrically active auxiliary material 103*b* is provided, which exchanges electrons with the counter electrode 103. In the $CO_2$ recovery mode, the first voltage V1 is applied between the working electrode 102 and the counter electrode 103 such that the counter electrode potential is greater than the working electrode potential. As a result, the electron donation of the electrically active auxiliary material 103*b* and the electron attraction of the $CO_2$ adsorbent 102*b* can be realized at the same time. Therefore, electrons are supplied from the electrically active auxiliary material 103*b* to the $CO_2$ adsorbent 102*b*, which enables the binding strength between the $CO_2$ adsorbent 102*b* and $CO_2$ can be increased.

Furthermore, in the present embodiment, in the $CO_2$ discharge mode, the second voltage V2, which is lower than the first voltage V1, is applied between the working electrode 102 and the counter electrode 103. Consequently, the electron attraction of the electrically active auxiliary material 103*b* and the electron donation of the $CO_2$ adsorbent 102*b* can be realized at the same time. Therefore, electrons are supplied from the $CO_2$ adsorbent 102*b* to the electrically active auxiliary material 103*b*, which enables $CO_2$ to be desorbed from the $CO_2$ adsorbent 102*b*. As a result, $CO_2$ can be separated and recovered, and the $CO_2$ adsorbent 102*b* can be regenerated to adsorb $CO_2$ again.

Moreover, in the present embodiment, the $CO_2$ adsorbent 102*b* is held in the working electrode base material 102*a* using the working electrode binder 102*d*. As a result, the $CO_2$ adsorbent 102*b* is less likely to become detached from the working electrode base material 102*a*, and a decrease in the amount of $CO_2$ adsorbed by the electrochemical cell 101 over time can be suppressed.

In addition, in the present embodiment, the insulating layer 104 is provided between the working electrode 102 and the counter electrode 103. As a result, electrical short circuiting that occurs due to physical contact between the working electrode 102 and the counter electrode 103 can be suppressed.

Also, in the present embodiment, the ion conductive material 106 is provided between the working electrode 102 and the counter electrode 103. As a result, conduction to the $CO_2$ adsorbent 102b can be promoted. Further, by using a non-volatile ionic liquid or a solid electrolyte as the ion conductive material 106, it is possible for conduction promotion to the $CO_2$ adsorbent 102b by the ion conductive material 106 to be maintained over a long period of time.

Other Embodiments

The present invention is not limited to the embodiment described above, and various modifications can be made as follows without departing from the spirit of the present invention. Moreover, the means disclosed in the embodiment described above may be appropriately combined to the extent feasible.

Figure 14:
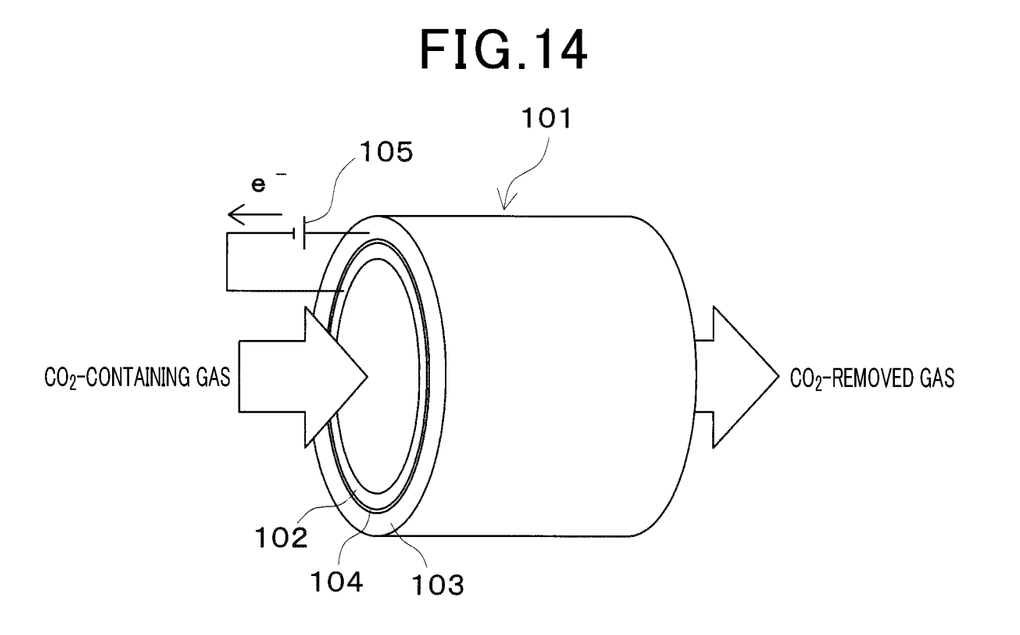
FIG. 14 is a drawing showing a modification of the electrochemical cell.

For example, in the embodiment described above, the working electrode 102, the counter electrode 103, and the insulating layer 104 of the electrochemical cell 101 are each plate-shaped members. However, as shown in FIG. 14, the working electrode 102, the counter electrode 103, and the insulating layer 104 may each be cylindrical members. In this case, the working electrode 102 may be arranged on the innermost side, the counter electrode 103 may be arranged on the outermost side, and the insulating layer 104 may be arranged between the working electrode 102 and the counter electrode 103. As a result, the space formed on the inner side of the working electrode 102 can be used as a gas flow path that the $CO_2$-containing gas passes through.

Furthermore, in the embodiment described above, an example has been described in which the working electrode 102 is provided with the working electrode base material 102a. However, the working electrode base material 102a does not have to be provided. Because the $CO_2$-containing gas can be diffused by the porous $CO_2$-containing gas 102b itself, and an electrically conductive path to the $CO_2$ adsorbent 102b can be formed by the working electrode conductive material 102c, the working electrode 102 can be formed by the $CO_2$ adsorbent 102b and the conductive material 102c. As a result, the proportion of the $CO_2$ adsorbent 102b in the working electrode 102 can be increased, and the density of $CO_2$ adsorption sites can be improved.

Moreover, in the embodiment described above, the working electrode binder 102b for holding the $CO_2$ adsorbent 102b in the working electrode base material 102a is provided. However, the present invention is not limited to this, and the working electrode binder 102d may also be omitted.

Also, in the embodiment described above, the ion conductive material 106 is provided between the working electrode 102 and the counter electrode 103. However, the present invention is not limited to this, and the ion conductive material 106 may also be omitted.

What is claimed is:

1. A carbon dioxide recovery system that separates $CO_2$ from a $CO_2$-containing gas which contains $CO_2$ by an electrochemical reaction, comprising:
    an electrochemical cell comprising a working electrode containing a $CO_2$ adsorbent, and a counter electrode, wherein application of a voltage between the working electrode and the counter electrode causes electrons to be supplied from the counter electrode to the working electrode, and enables the $CO_2$ adsorbent to bind to $CO_2$ as electrons are supplied,
    the $CO_2$ adsorbent is a crystalline porous embody having a metal-organic framework,
    the $CO_2$ adsorbent has a molecular structure in which a functional group that exchanges electrons and binds to $CO_2$ is regularly arranged at bridging portions of the crystalline porous body to regularly arrange the functional group in the crystalline porous body, and
    the functional group arranged at the bridging portions contains F, O, N, Cl, or S.

2. The carbon dioxide recovery system according to claim 1, wherein in the $CO_2$ adsorbent, the functional group is regularly arranged in a bridging portion of a crystal lattice.

3. The carbon dioxide recovery system according to claim 1, wherein the functional group arranged at the bridging portions is a ketone group.

4. The carbon dioxide recovery system according to claim 3, wherein the metal-organic framework has an Al ion coordinated with benzophenone dicarboxylate having a ketone group.

5. A carbon dioxide recovery system according to claim 1, wherein the counter electrode includes an auxiliary material that exchanges electrons, and
    application of a first voltage between the counter electrode and the working electrode, at which a potential of the counter electrode is higher than a potential of the working electrode, causes electrons to be supplied from the auxiliary material to the $CO_2$ adsorbent, and the $CO_2$ adsorbent to bind $CO_2$.

6. The carbon dioxide recovery system according to claim 5, wherein application of a second voltage, which is lower than the first voltage, between the counter electrode and the working electrode causes electrons to be supplied from the $CO_2$ adsorbent to the auxiliary material, and $CO_2$ adsorbed by the $CO_2$ adsorbent to be desorbed.

7. A carbon dioxide recovery system according to claim 1, wherein the working electrode contains an electrically conductive material, and the electrically conductive material is in a mixed state with the $CO_2$ adsorbent.

8. The carbon dioxide recovery system according to claim 7, wherein the electrically conductive material is constituted by a carbonaceous material.

9. A carbon dioxide recovery system according to claim 1, wherein the working electrode contains an electrode base material having electrical conductivity, and
    the $CO_2$ adsorbent is held in the electrode base material.

10. The carbon dioxide recovery system according to claim 9, wherein the electrode base material is composed of a carbonaceous material or a metallic material, and has a porous structure in which pores are formed that the $CO_2$-containing gas can pass through.

11. A carbon dioxide recovery system according to claim 9, wherein the working electrode contains a binder for holding the $CO_2$ adsorbent in the electrode base material.

12. A carbon dioxide recovery system according to claim 1, wherein an ion conductive material having ionic conductivity is provided between the working electrode and the counter electrode, and the ion conductive material is an ionic liquid or a solid electrolyte.

13. A carbon dioxide recovery system according to claim 1, wherein an insulating layer which is not conductive is provided between the working electrode and the counter electrode.

14. A working electrode used in a carbon dioxide recovery system that separates $CO_2$ from a $CO_2$-containing gas containing $CO_2$ by an electrochemical reaction, the carbon dioxide recovery system comprising an electrochemical cell comprising a working electrode, and a counter electrode, the working electrode comprising a $CO_2$ adsorbent, wherein application of a voltage between the working electrode and the counter electrode causes electrons to be supplied from the counter electrode to the working electrode, and enables the $CO_2$ adsorbent to bind to $CO_2$ as electrons are supplied, and the $CO_2$ adsorbent is a crystalline porous body having a metal-organic framework, the $CO_2$ adsorbent has a molecular structure in which a functional group that exchanges electrons and binds to $CO_2$ is regularly arranged at bridging portions of the crystalline porous body to regularly arrange the functional group in the crystalline porous body, and the functional group arranged at the bridging portions contains F, O, N, Cl, or S.

15. The carbon dioxide recovery system according to claim 1, wherein in the crystalline porous body, the functional group that exchanges electrons can be regularly arranged inside the structure as a result of an organic ligand containing the functional group that exchanges electrons forming a coordination bond to a metal.

16. The carbon dioxide recovery system according to claim 1, wherein in the crystalline porous body, the functional group that exchanges electrons can be regularly arranged inside the structure as a result of a monomer containing the functional group that exchanges electrons forming bonds to form a lattice.

* * * * *